United States Patent [19]

Meeker et al.

[11] Patent Number: 4,517,236
[45] Date of Patent: May 14, 1985

[54] FIBROUS PRODUCT

[75] Inventors: Brian L. Meeker, Maumee; John W. Ferguson, Perrysburg; Henry G. Werner, Rossford, all of Ohio

[73] Assignee: Fiber-Lite Corporation, Toledo, Ohio

[21] Appl. No.: 529,229

[22] Filed: Sep. 6, 1983

[51] Int. Cl.³ ............................................. B32B 23/02
[52] U.S. Cl. ..................... 428/192; 428/49; 264/112; 264/113; 156/62.4
[58] Field of Search ................. 428/49, 192; 264/112, 264/113; 156/62.4

[56] References Cited

U.S. PATENT DOCUMENTS

| | | | |
|---|---|---|---|
| 2,612,462 | 9/1952 | Zettel | 264/113 |
| 2,716,788 | 9/1955 | Naramore | 428/192 |
| 3,021,247 | 2/1962 | Stephens | 428/192 |
| 4,142,007 | 2/1979 | Lampe | 264/112 |
| 4,360,553 | 11/1982 | Landheer | 428/192 |

Primary Examiner—John E. Kittle
Assistant Examiner—James J. Seidleck
Attorney, Agent, or Firm—Emch, Schaffer & Schaub

[57] ABSTRACT

A fibrous product is disclosed having a first layer of high density substantially rigid fibrous material. The first layer has a first surface and a second surface. The first layer defines an edge around the outer periphery of the first and second surfaces. A second layer of fibrous material is positioned adjacent the second surface of the first layer. The second layer is at least twice as thick as the first layer and the second layer has less than one-half the density and rigidity of the first layer. The second layer defines an edge around the outer periphery of the second layer. The edge of the second layer is substantially in alignment with the edge of the first layer. A covering of decorative fabric material is positioned at least on the first surface of the first layer and along the edges of the first and second layers.

29 Claims, 8 Drawing Figures

FIBROUS PRODUCT

BACKGROUND OF THE INVENTION

This invention relates to a fibrous product that is used in acoustical and decorative applications. More particularly, the invention relates to a dual density fibrous having good shape retention qualities and well-defined corners and edges. One application of the invention is directed to the use of this dual density fibrous product to make ceiling tiles that can be supported by the grid work that is normally associated with a suspended ceiling. This dual density fibrous material can also be used to make acoustical panels for use on the walls of a building.

Fibrous material has been used for a number of years to form acoustical and thermal products. The fibrous material is normally webs or batts of fibrous glass. However, other fibrous material such as mineral, organic or inorganic fibers can be used. Such fibrous material can be cut or molded to the desired shape to be used in the finished product. However, the fibrous material does not possess much rigidity or strength unless the fibers are compacted into a dense product. Such a dense product significantly increases the weight of the fibrous material and also reduces the thermal insulating characteristics of the fibrous material. A low density fibrous material has an acceptable weight and the desired thermal insulating characteristics but it is difficult to form sharp edges or corners in such a lower density fibrous product. In addition, the corners and edges in such a lower density product are frequently damaged during shipping, handling and actual use of such as product. Further, it is difficult to position a decorative surface, such as a fabric, on a lower density product as there is too much give and flexibility in the fibrous material to adequately bond the decorative material to the fibrous material. The positioning of the decorative material on the lower density fibrous material can also deform the configuration of the fibrous material.

A ceiling tile that is used in a suspended ceiling arrangement is a good example of a fibrous product wherein the above described limitations are extremely important. Such a ceiling tile is suspended around its outer periphery by a metal grid work that is suspended from the ceiling. Only a small portion of the outer periphery of the ceiling tile actually engages the metal grid work. Accordingly, there must be enough strength and rigidity in the outer periphery of the ceiling tile to support the ceiling tile without any sagging or structural failure. At the same time the ceiling tile should be light in weight so as not to place to great of a load on the support grid work and to reduce the load that the ceiling tile places on the outer periphery of the tile that engages the metal grid work. The ceiling tile should also have good thermal and acoustical characteristics that allow it to reduce the noise level and heat transmission level in the room where it is positioned. Such a ceiling tile should also be capable of accepting decorative surface coverings to enhance the appearance of the ceiling tile. Such covering should be firmly bonded to the fibrous material of the ceiling tile and it is particularly desirable to have sharp, well-defined edges and corners that will maintain their shape during handling, installation and use of the ceiling tiles.

From the above it is clear that it would be desirable to use a high denisty fibrous material to form such a ceiling tile so that the outer periphery of the ceiling tile would have sufficient strength to adequately support the ceiling tile in the suspended ceiling support grid. However, using a high density product significantly increases the weight of the ceiling tile and places undue loads on the support grid work. Such a high density product also greatly increases the cost of the ceiling tile and makes it much less cost competitive in the marketplace. A high density fibrous material also reduces the thermal insulating properties of the ceiling tile which is undesirable. At the same time the use of a low density fibrous material does not provide adequate strength to support the ceiling tile without the possibility of sagging or structural failure of the ceiling tile. In addition, such a low density fibrous material does not have the requisite physical integrity to form sharp, well-defined edges and corners and to maintain this appearance during actual use of the ceiling tile.

To remedy the above-discussed difficulties and limitations the manufacturers of ceiling tile normally select a fibrous material having a density that is compromised between the desirable properties of a high density product and the desirable properties of a low density product. Such a intermediate density product does not have the strength and appearance characteristics that are desirable and also does not exhibit the desired thermal characteristics. Such an intermediate density product also is not as light and cost efficient as the use of a lower density product.

In view of the above-enumerated shortcomings and difficulties, it is clear that there is a need in the marketplace for a fibrous product that can be used in such applications as ceiling tile that exhibits the characteristics of a high density product and the characteristics of a low density product. Such a product would be particularly suitable for use in ceiling tile, acoustical panels and other applications where decorative fibrous products having acoustical and thermal characteristics have been used in the past.

SUMMARY OF THE INVENTION

According to the invention, there is provided a ceiling tile for suspension in a grid-type support structure. The ceiling tile has a first layer of high density substantially rigid fibrous material and the first layer has a first surface and a second surface. The first layer defines an edge around the outer periphery of the first and second surfaces. A second layer of fibrous material is positioned adjacent the second surface of the first layer. The second layer is at least twice as thick as the first layer and the second layer has less than one-half the density and rigidity of the first layer. An edge is defined around the periphery of the second layer and the edge is substantially in alignment with the edge of the first layer. A projection extends from the edge of the second layer and the projection is spaced apart from the first layer. The projection is disposed for engaging the support grids and the projection is formed from the fibrous material of the second layer. A covering of decorative material is positioned on the first surface of the first layer, along the edges of the first and second layers, and on a portion of the projection that is disposed for engaging the support grids.

It is an object of the invention to provide an improved fibrous product for use in decorative and acoustical applications.

It is an additional object of the invention to provide an improved ceiling tile for use in suspended ceiling applications.

Other objects and advantages of the invention will become apparent when the invention is described hereinafter in more detail with reference to the accompanying drawings.

PREFERRED EMBODIMENT

The invention relates to acoustical products made of fibrous material. More particularly the invention relates to sound absorbing panels and ceiling tile having good acoustical and dimensional properties. The fibrous material is normally webs or batts of fibrous glass. However, other fibrous material such as mineral, organic or inorganic fibers can be used. To facilitate explanation, the invention will be shown and described in terms of a ceiling tile application. Such description is not meant to limit, in anyway, the invention or the particular uses for the invention. The details of the invention will be more fully understood by referring to the attached drawings in connection with the following description.

Figure 1:
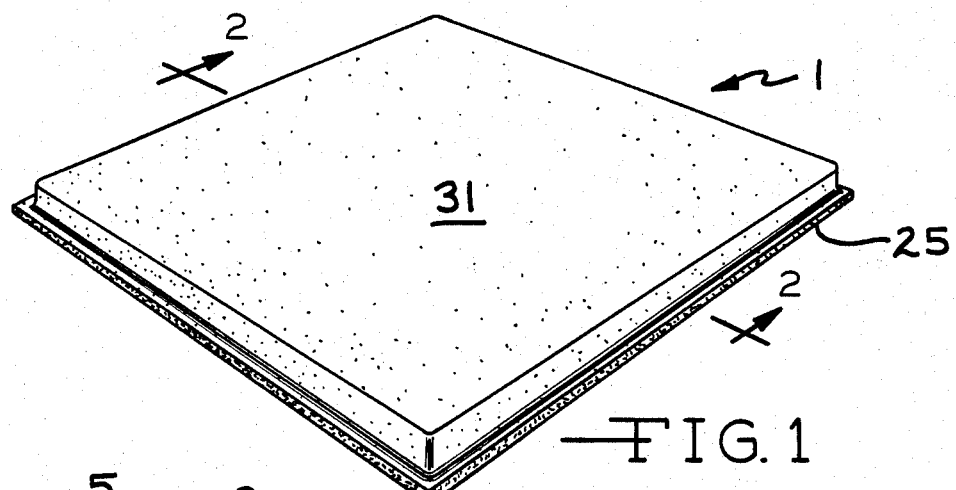
FIG. 1 is a perspective view of one embodiment of the present invention.
Figure 2:
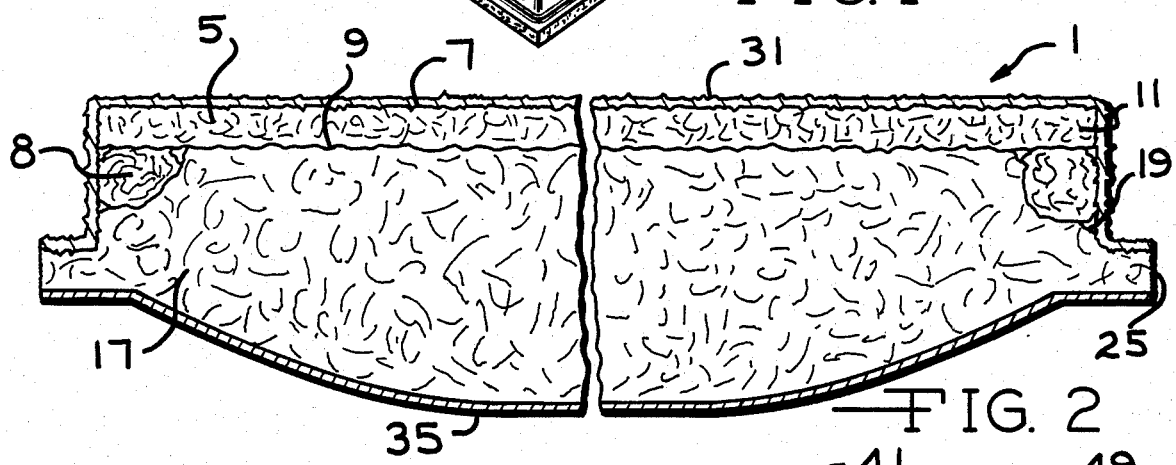
FIG. 2 is a cross-sectional view of the invention of FIG. 1 taken along line 2—2 in FIG. 1.

FIGS. 1 and 2 show one embodiment of the acoustical products of the present invention. This product is specifically a ceiling tile that is designed for use in suspended ceilings. The ceiling tile 1 has a first layer 5 of high density substantially rigid fibrous material. The first layer 5 normally has a density from about 5 to about 25 pounds per cubic foot and a thickness from about 1/16 to about $\frac{3}{4}$ of an inch. The density of the first layer is substantially uniform. In practice it has been found that a density from about 6 to about 10 pounds per cubic foot works particularly well for the first layer 5. The first layer 5 has a first surface 7 and a second surface 9. The first and second surfaces are in opposed and substantially parallel relationship. The first and second surfaces of the first layer 5 are substantially smooth. An edge 11 is defined around the outer periphery of the first layer of fibrous material. The edge 11 is substantially perpendicular to the first surface 7 and the second surface 9 of the first layer 5. The high density and substantially rigid fibrous material that is used for the first layer 5 allows the edge 11 to be formed very precisely in the fibrous material. Accordingly, the edge will be substantially perpendicular to the surfaces of the first layer and the edge 11 will retain this configuration even though the ceiling tile 1 is handled frequently.

Positioned adjacent the first layer 5 is a second layer 17 of fibrous material. The second layer is positioned adjacent the second surface 9 on the first layer 5. The second layer is substantially the same size and shape as the first layer 5 and the second layer is substantially in alignment with the first layer. The fibrous material of the second will normally have from about $\frac{1}{8}$ to about $\frac{1}{2}$ of the density and rigidity of the fibrous material of the first layer. In practice it has been found that the second layer should be at least twice as thick as the first layer and have less than $\frac{1}{2}$ of the density and rigidity of the first layer of the fibrous material. The second layer normally as a density from about 2 to about 8 pounds per cubic foot and a thickness from about $\frac{3}{8}$ of an inch to about 2 inches. An edge 19 is defined around the outer periphery of the second layer 17. The edge 19 is substantially in alignment with the edge 11 on the first layer 5. A projection 25 extends from the edge 19 of the second layer 17. The projection is normally spaced apart from the first layer 5 of the tile 1. The projection extends around the outer periphery of the second layer 17 and is disposed for engaging support grids for a suspended ceiling. The projection is formed from the fibrous material of the second layer 17, however, the projection has a thickness and a rigidity from about $\frac{1}{2}$ to about $1\frac{1}{2}$ of the thickness and rigidity of the first layer 5. In practice it has been found that the projections will work particularly well if the projections have substantially the same thickness and rigidity as the fibrous material of the first layer. Also, it has been found to be preferable to have the projection extend from substantially the mid point of the edge 19 of the second layer 17. A portion of the second layer 17 extends from said projection in a direction away from the first layer. Thus, the thickest part of the second layer is located within the projection that extends around the outer periphery of the second layer. Accordingly, the full thickness of the second layer 17 is located in that area that is immediately adjacent and in alignment with the first layer. The surface of the second layer 17 that is spaced apart from the first layer extends from adjacent the projection 25 in a substantially arcuate manner until the full thickness of the second layer 17 is obtained.

As shown in FIG. 2, a small piece 8 of fibrous material can be positioned along the edge 19 of the second layer 17 of the ceiling tile to fill in the gap between the first layer 5 and the second layer 17. The small piece 8 is positioned to fill in the edge to avoid a weak spot along the edge of the ceiling tile and to form a well-defined and straight edge. It is also possible to just place small pieces 8 of fibrous material in the corners between the first and second layers of fibrous material. This insures that the corners are completely filled with fibrous material and that the corners can withstand the handling and wear-and-tear normally received by a ceiling tile.

A phenolic resin or other suitable adhesive can be placed between the first layer 5 and the second layer 17 to bond the two layers of fibrous material. The phenolic resin is normally in powder form and works particularly well in bonding together and preventing delamination between the two layers of the ceiling tile.

A layer of decorative fabric material 31 is positioned on the first surface 7 of the first layer 5. The fabric layer 31 also extends along the edge 11 of the first layer and along the edge 19 of the second layer. The high density first layer 5 provides a uniform and smooth surface upon which the fabric layer can be positioned. The smooth surface of the first layer provides a good base for adhering the fabric layer. The smooth first layer also reduces the possibility of wrinkles or other imperfections showing through the fabric layer. In most applications the fabric layer will also extend along at least a portion of the projection 25 that is positioned around the outer periphery of the second layer 17. The fabric layer 31 provides the finished decorative surface for the ceiling tile 1. In most applications it is desirable to have the fabric layer extend over a sufficient portion of the projection 25 to insure that the fabric layer is covered by the supporting gridwork used to support the ceiling tile. This provides a completely finished look for the ceiling tile when positioned in the supporting grid structure.

Because of the high density and rigidity of the first layer 5 the corners and edges of the ceiling tile can be formed at right angles to provide a crisp angular appearance for the ceiling tile. Because of the rigidity and high density of the first layer this sharp angular appearance will be retained after the fabric layer 31 is applied to the ceiling tile and will be maintained during use of the ceiling tile. The rigidity of the first layer prevents the corners and edges from becoming rounded or from sagging during the use of the tile.

A foil layer 35 can be positioned on the surface of the second layer 17 that is spaced apart from the first layer 5. The foil layer provides a finished surface for the back of the ceiling tile and provides additional acoustical and thermal characteristics for the ceiling tile.

The ceiling tile is designed to be positioned in a suspended ceiling application. Normally in such an application a gridwork is positioned adjacent the ceiling of a room and then the ceiling tile is positioned in the gridwork to form a suspended ceiling. The projections 25 that extend from the edge of the ceiling tile around the outer periphery of the ceiling tile engage the gridwork and act to support the ceiling tile. Since the fibrous material of the second layer 17, in the area of the projection, is denser and more rigid than the rest of the second layer the projection has increased strength and rigidity that allow it to support the ceiling tile.

Figure 3:
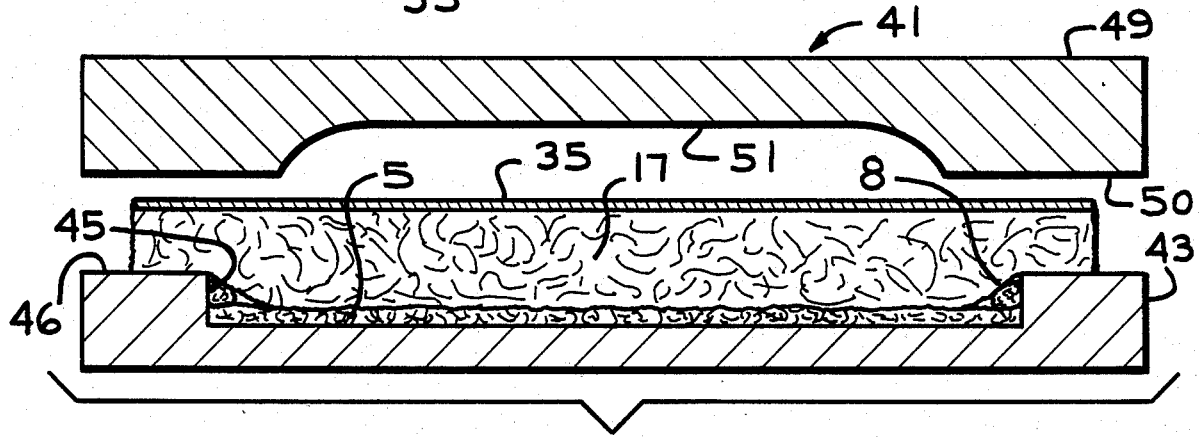
FIG. 3 is a cross-sectional view of the mold used to form the fibrous product of FIG. 1.
Figure 4:
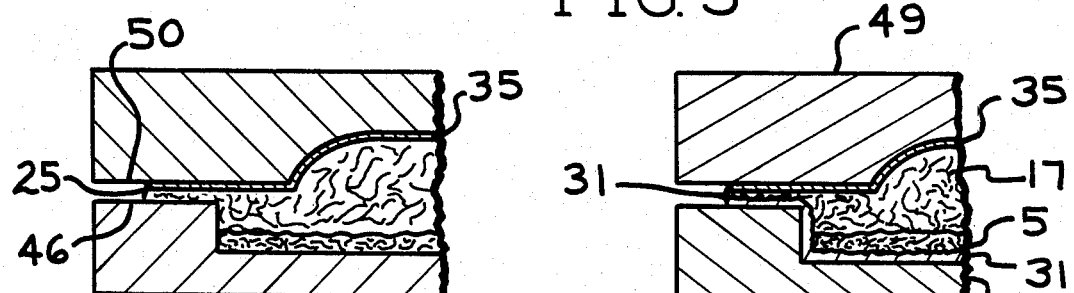
FIG. 4 is a partial cross-sectional view of the mold shown in FIG. 3 with the mold in the closed position.
Figure 5:
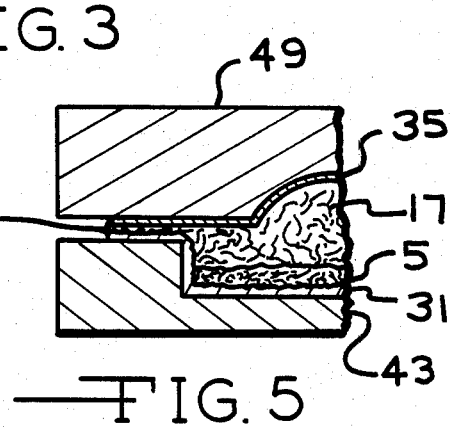
FIG. 5 is a partial cross-sectional view of the mold utilized to mold the fibrous product of FIG. 1 with the mold in the closed position.

The way of making the ceiling tile shown in FIGS. 1 and 2 is demonstrated in FIGS. 3, 4 and 5 of the attached drawings. In making such a ceiling tile the first layer 5 of fibrous material is positioned in a mold 41. The mold has a first section 43 that defines a mold cavity 45 and a surface 46 adjacent the edge of the mold cavity. The mold 41 also has a second section 49 and the second section has a chamber 51 located therein. The second section also has a surface 50 that is positioned adjacent the edge of the chamber 51. The first section 43 and second section 49 of the mold 41 are disposed so that they can be brought into mating engagement to mold material. The molding cavity 45 and chamber 51 are disposed in opposed relationship.

Figure 6:
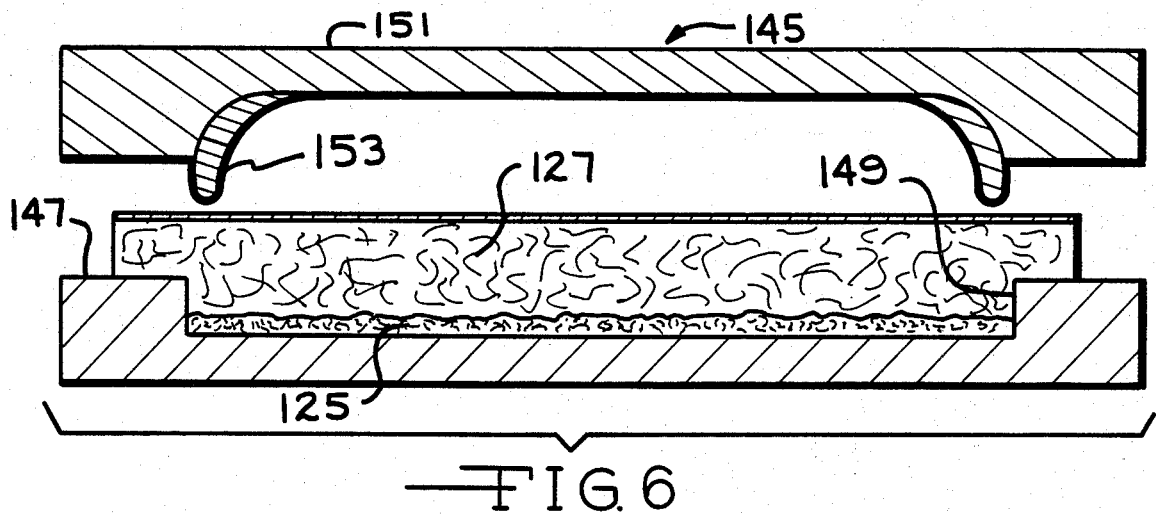
FIG. 6 is a cross-sectional view of another embodiment of a mold that can be used to make a fibrous product.

The first layer of fibrous material 5 is positioned in the mold cavity 45 located in the first section 43 of the mold 41. The first layer is cut to size so that it covers substantially the entire base surface of the mold cavity 45. A phenolic resin or other adhesive can be positioned on the second surface 9 of the first layer 5 if it is desired to bond together the first and second layers. Also, the small pieces 8 of the fibrous material can be positioned in the mold along the edges of the first layer or only in the corners of the first layer. A quantity of fibrous material that is used to form the second layer 17 is then positioned in the mold cavity 45. The second layer 17 of fibrous material is positioned so that it extends beyond the ends of the mold cavity and covers the surface 46 that is adjacent the mold cavity. The foil layer 35 can also be positioned on the surface of the second layer 17 that is spaced apart from the first layer 5 in the mold cavity 45. Once the fibrous material for the first layer 5 and second layer 17 are positioned in the mold cavity 45 the second section 49 of the mold 41 is moved towards the first section 43. As the second section 49 moves toward the first section 43 the fibrous material forming the second layer 17 is compressed and molded to the desired shape for the ceiling tile. Since the first layer 5 is formed of a substantially rigid and high density fibrous material this layer is compressed very little, if any, during the molding process as it is much easier to compress and shape the low density fibrous material of the second layer 17. The second section 49 of the mold 41 continues to move toward the first section 43 until the second section 49 is substantially adjacent the first section. This relationship is best shown in FIG. 6 of the drawings. The fibrous material of the second layer 17 that extends beyond the mold cavity 45 is compressed between the surface 46 of the first section 43 and the surface 50 on the second section 49 to form the projection 25 that extends around the outer periphery of the ceiling tile. The fibrous material for the projection 25 is compressed to the extent where it has from about ½ to about twice the thickness, density and rigidity of the fibrous material of the first layer. In practice it has been found preferable to compress the fibous material for the projection 25 until it has substantially the same thickness, density and rigidity as the fibrous material used to form the first layer 5 for the ceiling tile. As the second section 49 advances towards the first section 43 the fibrous material of the second layer 17 moves into the chamber 51 in the second 49. The chamber 51 forms the portion of the second layer 17 that extends from the projection 25 in a direction away from the first layer 5. The chamber 51 is positioned to reduce the degree of compression experienced by a substantial portion of the second layer 17 to insure that the fibrous material of the second layer does not compress beyond desirable levels. This insures that the thermal insulating qualities of the fibrous material of the second layer 17 will remain at the desired levels. As can be seen in FIG. 6 the foil layer 35 on the second layer 17 is also molded during this molding operation so that the foil layer conforms to the shape of the molding surface of the second section 49.

After the fibrous material for the ceiling tile has been molded the mold 41 is opened by moving the section 49 away from the first section 43 and the molded fibrous material removed from the mold. The decorative fabric material 31 is them positioned in the mold cavity 45 of the first section 43. The fabric layer 31 also extends over the surface 46 of the first section of the mold 41. The already molded fibrous material is then positioned in the mold with the first layer 5 being in contact with the decorative fabric layer 31. The second section 49 of the mold 41 is then again advanced towards the first section 43 to conform and adhere to the fabric layer to the molded fibrous material forming the ceiling tile. It should be noted that since the fabric layer extends over the surface 46 of first section of the mold, the fabric also extends along the projection 25 that extends from the periphery of the ceiling tile. The force exerted upon the fabric during the closing of the mold 41 moves the fabric into conformance with the shape of the molded fibrous material of the ceiling tile. In this manner the decorative fabric material is positioned on the ceiling tile and the molding process insures that the fabric conforms to the shape of the ceiling tile. An adhesive can be positioned on the fabric to insure that it is bonded to the fibrous material forming the ceiling tile. After the fabric has been secured to the fibrous material the ceiling tile is removed from the mold 41 and the ceiling tile is now ready for use in an suspended ceiling.

Figure 7:
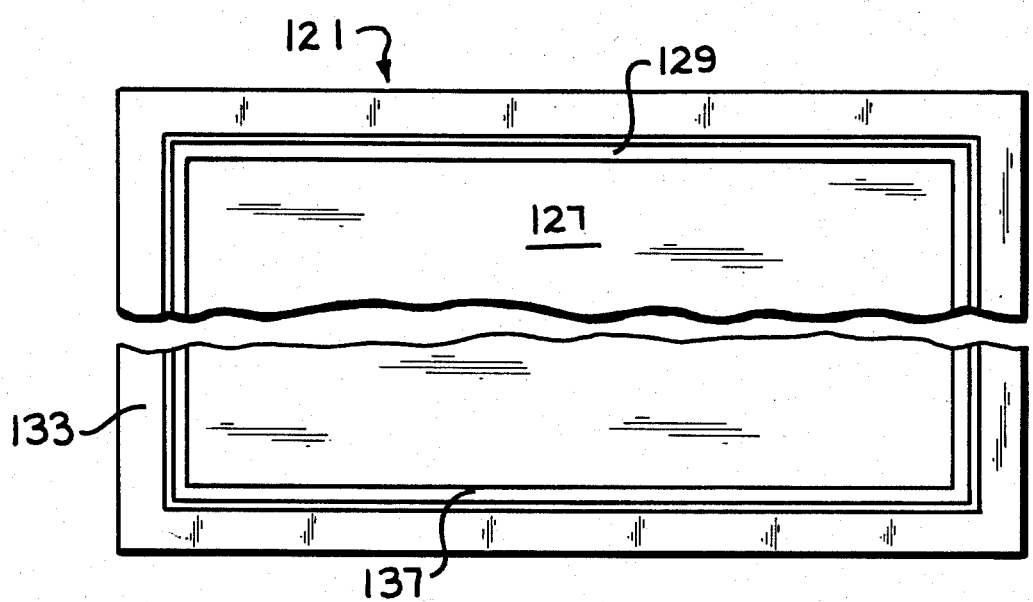
FIG. 7 is a plan view of the fibrous product produced using the mold of FIG. 6.
Figure 8:
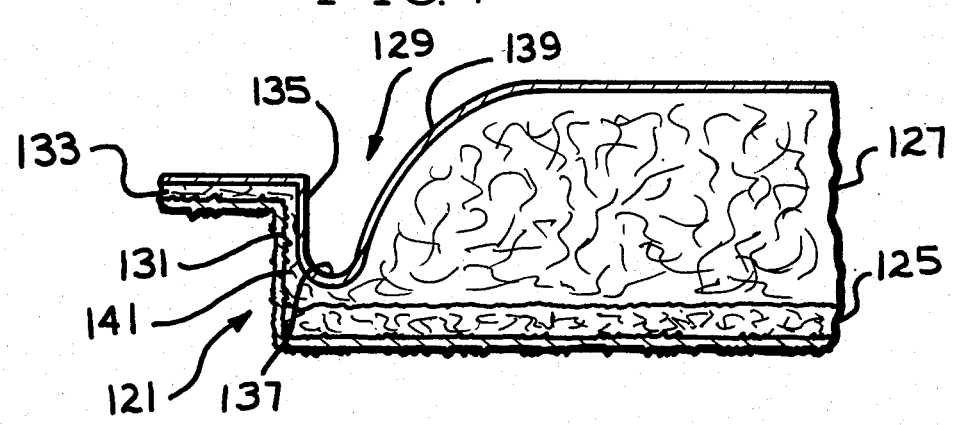
FIG. 8 is a cross-sectional view of the product shown in FIG. 7.

FIGS. 6–8 show another embodiment of a ceiling tile that is a part of the present invention. This product is designed particularly for use in suspended ceilings. The ceiling tile 121 has a first layer 125 of high density and substantially rigid fibrous material and a second layer 127 of lower density fibrous material. The first and second layers of fibrous material and the other features of the ceiling tile are substantially the same as the ceiling tile as shown and described in FIGS. 1 and 2. However, the ceiling tile 121 has a groove 129 formed in the second layer 127 of fibrous material. The groove 129 is positioned adjacent the edge 131 of the second layer 127 and the projection 133 that extends from the second layer of the ceiling tile 121. The groove 129 has a first leg 135 that extends from substantially the top of the projection 133 in a direction towards the first layer 125. The first leg 135 is substantially parallel to the edge 131 of the second layer. The groove terminates in a base 137 that is positioned adjacent the first layer 125. The base 137 is normally spaced from about 1/16 to about $\frac{1}{2}$ of an inch from the first layer 125. The base normally has a width from about $\frac{1}{8}$ of an inch to about 1 inch. The groove 129 has a second leg 139 that extends from said base 137 to the top of the second layer 127. The second leg 139 has a generally arcuate configuration and extends to the top of the second layer 127 of fibrous material. The section 141 of fibrous material located between the edge 131 of the second layer 127 and the first leg 135 of the groove 129 is compressed to a greater extent than the fibrous material in the center of the second layer. The section 141 has a density and rigidity that is substantially the same as the density and rigidity of the first layer 125. The section also has a thickness that is substantially the same as the thickness of the first layer. Accordingly, the section 141 has a density from about 5 to about 25 pounds per cubic foot and a thickness from about 1/16 to about $\frac{3}{4}$ of and inch. The section 141, accordingly, provides a rigid and high density area adjacent the edge 131 of the second layer 127. The high density section 141 provides good definition and smoothness for the edge 131 and improves the strength of the ceiling tile along the edge 131.

The mold 145 for making the ceiling tile 121 is shown in FIG. 6. This mold has a first section 147 that defines a mold cavity 149 and a section 151. The mold 145 is substantially similar in construction and operation as the mold shown in FIG. 5. However, the mold 145 has a lip 153 that extends from the second section into the mold cavity 149 in the first section 147. The lip 153 forms the groove 129 in the second layer 127 when the second section 151 is advanced towards the first section 147 to close the mold 145.

If the base 137 of the groove 129 is spaced apart from the first layer 125 a sufficient distance, small pieces of fibrous material as previously disclosed with regard to FIG. 2 can be placed in the corners of the ceiling tile between the first and second layers of fibrous material. The pieces of fibrous material can be used to fill in the corners to avoid weak spots in the corners of the ceiling tile. However, if the groove 129 extends close to the first layer 125, the fibrous material of the second layer will fill any gaps or open spaces between the first and second layers of fibrous material.

The first layer of high density and substantially rigid fibrous material used in all embodiments of the invention adds a great deal of strength to the ceiling tile. The first layer has enough strength to prevent the surface of the ceiling tile that faces the room from sagging or deflecting. The groove that is positioned around the outer periphery of the ceiling tile also greatly increases the strength and rigidity around the edge of the ceiling tile. The increase in strength in the edge of the ceiling tile is very important as the support grid for the ceiling tile engages the edge of the ceiling tile. The strength of the first layer and the strength created by the groove around the periphery allows the ceiling tile product to extend across a larger span without objectionable sag. Accordingly, the strength of the high density and rigid first layer along with the strength and rigidity created by the groove increases the usability of the ceiling tile product.

Having described the invention in detail and with reference to the drawings it is understood that such specification is given only for the sake of explanation. Various modifications and substitutions other than those recited can be made without departing from the scope of the invention as set forth in the following claims.

What I claim is:

1. A ceiling tile for suspension in a grid-type support structure comprising:

a first layer of high density substantially rigid fibrous material, said first layer having a first surface and a second surface, said first layer defining an edge around the outer periphery of said first and second surfaces;

a second layer of fibrous material positioned adjacent said second surface of said first layer, said second layer being substantially the same size and shape as said first layer, said second layer being substantially in alignment with said first layer, said second layer being at least twice as thick as said first layer and said second layer having less than $\frac{1}{2}$ of the density and rigidity of said first layer, an edge being defined around the outer periphery of said second layer, said edge of said second layer being substantially in alignment with said edge of said first layer; and, a projection extending from said edge of said second layer, said projection being spaced apart from said first layer, said projection extending around the entire outer periphery of said second layer, said projection being disposed for engaging said support grids, said projection formed from said fibrous material of said second layer, said projection extending from substantially the mid point of said edge of said second layer, a portion of said second layer extending from said projection in a direction away from said first layer, said projection having a thickness that is substantially the same as the thickness of said first layer caused by compressing said second layer in the region of said projection, thereby giving said projection a density and rigidity substantially the same as the density and rigidity of said first layer.

2. The ceiling tile of claim 1, wherein a covering of decorative material positioned on said first surface of said first layer, along said edges of said first and second layers, and on said portion of said projection that is disposed for engaging said support grids.

3. The ceiling tile of claim 1, wherein said density of said first layer is substantially uniform.

4. The ceiling tile of claim 1, wherein said first surface of said first layer is substantially smooth to facilitate lamination of said decorative material to said first layer.

5. The ceiling tile of claim 1, wherein said first and second layer of fibrous material is a fibrous glass material.

6. The ceiling tile of claim 1, wherein said first layer has a density from about 5 to about 25 pounds per cubic foot and a thickness from about 1/16 to about ¾ of a inch.

7. The ceiling tile of claim 1, wherein said second layer has a density from about 2 to about 8 pounds per cubic foot and a thickness from about ⅜ of an inch to about 2 inches.

8. The ceiling tile of claim 1, wherein said projection extends from said second layer from about ⅛ to about ½ of an inch.

9. The ceiling tile of claim 1, wherein said projection has a surface disposed for engaging said support grids and said surface is substantially parallel to said first surface of said first layer.

10. The ceiling tile of claim 1, wherein said decorative material is a fabric material.

11. The ceiling tile of claim 1, wherein a groove is positioned around the outer periphery of said second layer.

12. The ceiling tile of claim 11, wherein said groove is positioned adjacent said edge of said second layer.

13. The ceiling tile of claim 12, wherein said groove extends in a direction towards said first layer of fibrous material.

14. The ceiling tile of claim 13, wherein said groove has a first leg, a base and a second leg.

15. The ceiling tile of claim 14, wherein said first leg of said groove is positioned adjacent and substantially parallel to said edge of said second layer.

16. The ceiling tile of claim 15, wherein a section of fibrous material is positioned between said first leg of said groove and said edge of said second layer, said section of fibrous material being compressed to have a density, rigidity and thickness that is substantially the same as the density, rigidity and thickness of said first layer.

17. The ceiling tile of claim 14, wherein said base is positioned substantially parallel to said first layer of fibrous material, said base being spaced apart from said first layer from about 1/16 to about ½ of an inch.

18. The ceiling tile of claim 16, wherein said groove and said section of fibrous material act to provide strength to said area of said ceiling tile that is adjacent said edge of said second layer and said projection.

19. A ceiling tile for suspension in a grid-type support structure comprising:
a first layer of high density substantially rigid fibrous material, said first layer having a first surface and a second surface, said first layer defining an edge around the outer periphery of said first and second surfaces;
a second layer of fibrous material positioned adjacent said second surface of said first layer, said second alyer being at least twice as thick as said first layer and said second layer having less than ½ of the density and rigidity of said first layer, an edge being defined around the outer periphery of said second layer, said edge of said second layer being substantially in alignment with said edge of said first layer;
a projection extending from said edge of said second layer, said projection being disposed for engaging said support grids, said projection formed from said fibrous material of said second layer; and,
a groove positioned around said surface of said second layer that is spaced apart from said first layer, said groove being adjacent said edge of said second layer, said groove extending in a direction towards said first layer of fibrous material, said groove being formed in said second layer in a manner to compress said fibrous material located between said groove and said edge of said second layer whereby the strength of said second layer adjacent said edge is increased.

20. The ceiling tile of claim 19, wherein a covering of decorative material positioned on said first surface of said first layer, along said edges of said first and second layers, and on said portion of said projection that is disposed for engaging said support grids.

21. The ceiling tile of claim 19, wherein said second layer is substantially the same size and shape as said first layer, said second layer being substantially in alignment with said first layer.

22. The ceiling tile of claim 21, wherein said projection extends from substantially the mid point of said edge of said second layer, a portion of said second layer extending from said projection in a direction away from said first layer.

23. The ceiling tile of claim 19, wherein said groove has a first leg, a base and a second leg.

24. The ceiling tile of claim 23, wherein said first leg of said groove is positioned adjacent and substantially parallel to said edge of said second layer.

25. The ceiling tile of claim 24, wherein a section of fibrous material is positioned between said first leg of said groove and said edge of said second layer, said section of fibrous material being compressed to substantially the desity, rigidity and thickness of said first layer.

26. The ceiling tile of claim 24, wherein said base is positioned substantially parallel to said first layer, said base being spaced apart from said first layer from about 1/16 to about ½ of an inch.

27. The ceiling tile of claim 26, wherein said base has a width from about ⅛ of an inch to about 1 inch.

28. The ceiling tile of claim 23 wherein said base of said groove has a width from about ⅛ of an inch to about 1 inch.

29. A ceiling tile for suspension in a grid-type support structure comprising:
a first layer of high density substantially rigid fibrous material, said first layer having a first surface and a second surface, said first layer defining an edge around the outer periphery of said first and second surfaces;
a second layer of fibrous material positioned adjacent said second surface of said first layer, said second layer being substantially the same size and shape as said first layer, said second layer being substantially in alignment with said first layer, said second layer being at least twice as thick as said first layer and said second layer having less than ½ of the density and rigidity of said first layer, an edge being defined around the outer periphery of said second layer, said edge of said second layer being substantially in alignment with said edge of said first layer;

a projection extending from said edge of said second layer, said projection being spaced apart from said first layer, said projection being disposed for engaging said support grids, said projection formed from said fibrous material of said second layer, said projection extending from substantially the mid point of said edge of said second layer, a portion of said second layer extending from said projection in a direction away from said first layer;

a groove positioned around said surface of said second layer that is spaced apart from said first layer, said groove being positioned adjacent said edge of said second layer, said goove having a first leg, a base and a second leg, said first leg being positioned adjacent and substantially parallel to said edge of said second layer, said groove extending in a direction towards said first layer of fibrous material, said base of said groove having a width from about $\frac{1}{8}$ of an inch to about 1 inch and said base being spaced apart from said first layer from about 1/16 to about $\frac{1}{2}$ of an inch;

a section of fibrous material positioned between said first leg of said groove and said edge of said second layer, said section of fibrous material being compressed to substantially the density, rigidity and thickness as the fibrous material of said first layer whereby said section and said groove increase the strength of said ceiling tile in the area adjacent said edge of said ceiling tile in the area adjacent said edge of said ceiling tile; and, a covering of decorative material positioned on said first surface of said first layer, along said edges of said first and second layers, and on said portion of said projection that is disposed for engaging said support grids.

* * * * *